Feb. 14, 1950     J. W. COURSEN ET AL     2,497,489
HYDRAULIC STRUT

Filed Jan. 3, 1946     2 Sheets-Sheet 1

INVENTORS.
Edwin J. Schweitzer
John W. Coursen
BY
M. B. Tasker
ATTORNEY

Feb. 14, 1950 J. W. COURSEN ET AL 2,497,489
HYDRAULIC STRUT
Filed Jan. 3, 1946 2 Sheets-Sheet 2
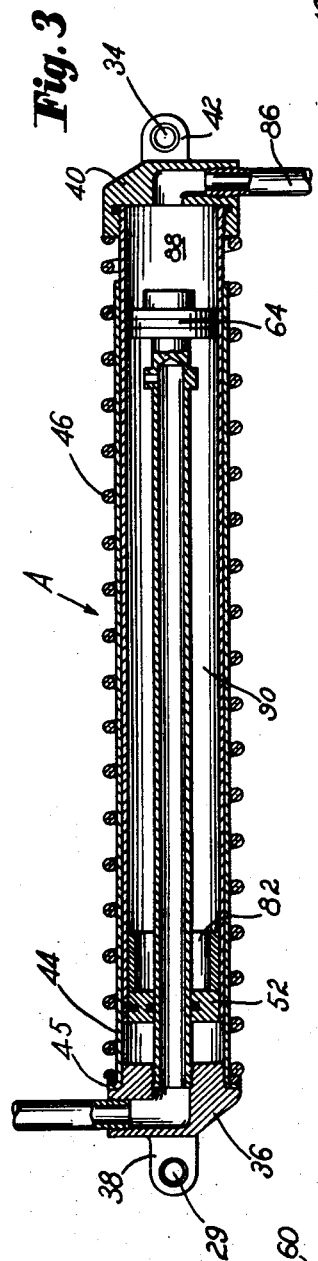
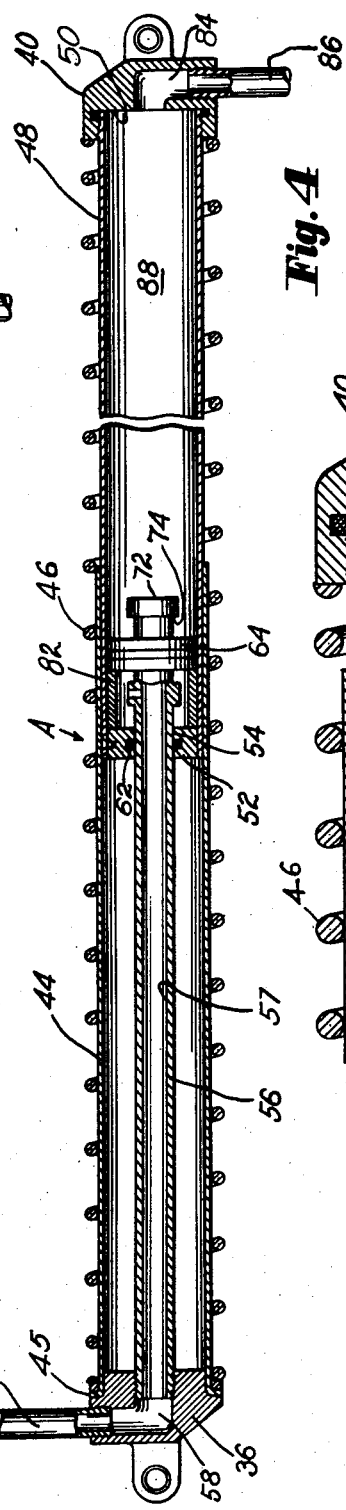
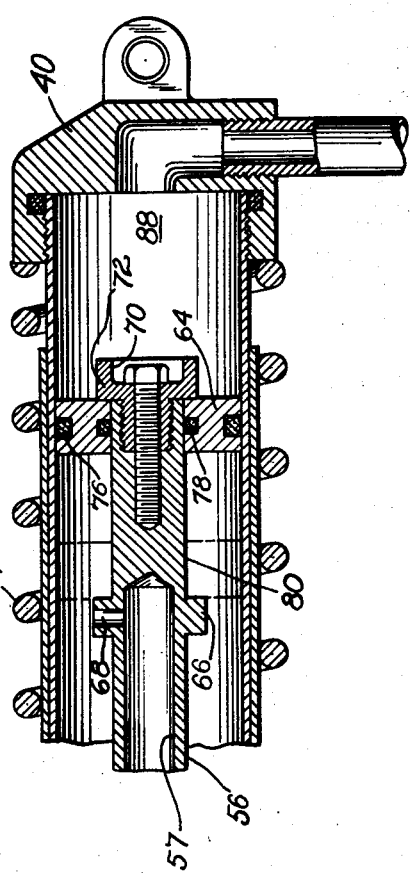
INVENTORS.
Edwin J. Schweitzer
John W. Coursen
BY
M. B. Tasker
ATTORNEY

UNITED STATES PATENT OFFICE 2,497,489

HYDRAULIC STRUT

John W. Coursen, New York, N. Y., and Edwin J. Schweitzer, Milford, Conn., assignors to United Aircraft Corporation, East Hartford, Conn., a corporation of Delaware Application January 3, 1946, Serial No. 638,872

8 Claims. (Cl. 60—97)

This invention relates to hydraulic actuating struts of the general type used, for example, in aircraft for extending and retracting landing gear.

Such a hydraulic strut comprises in general elongated telescoping cylinder and piston elements, one of which is connected to a fixed support and the other of which is operatively connected to a member to be moved, the piston element including a piston in the cylinder and a slender, hollow piston rod which extends through an end wall of the cylinder element. Hydraulic fluid is supplied through suitable passages including the hollow piston rod into the cylinder chamber at one side of the piston for telescoping the elements to retract the landing gear, while fluid is admitted to the cylinder chamber at the other side of the piston for extending the strut and consequently extending the landing gear.

The piston rod during the extending movement of the strut thus constitutes a long, hollow column which carries an enlarged diameter piston at its free end on which the working hydraulic pressure acts during the extension of the strut. During the extending movement of the strut the full available working pressure does not build up in the strut, but as the gear comes to rest in its extended position the hydraulic pressure in the strut builds up to the maximum line pressure. Thus in the fully extended position of the strut the slender, hollow piston rod is required to withstand a force resulting from the full working hydraulic pressure acting on the entire area of the piston. Accordingly, this rod has heretofore been of very heavy construction in order to resist buckling tendencies.

It is an object of this invention to provide an improved hydraulic actuating strut which, when extended, will eliminate a substantial part of the force acting upon the hollow piston rod due to the working hydraulic pressure acting upon its piston.

Due to production variations in the overall length of the landing gear linkages in their extended positions, the fully extended position of the actuating strut varies for different installations and it is a further object of this invention to provide for overtravel in the extending movement of the relatively movable strut elements to compensate for variations in the distance between the ends of the strut when fully extended for different landing gear linkages.

A further object of the invention is generally to improve the construction and operation of actuating hydraulic struts.

These and other objects and advantages of the invention will become apparent from the following detailed description of one embodiment of the invention which has been shown in the accompanying drawings for purposes of illustration.

In these drawings,

Fig. 3 is an enlarged view of the hydraulic actuating strut of Fig. 1 and Fig. 2 in its telescoped or retracted position;

Fig. 4 is a view of the same in its fully extended position, parts being broken away to facilitate illustration; and Fig. 5 is a further enlarged detail of the right hand end of Fig. 3 showing the floating piston which is an important element of the invention.

Figure 1:
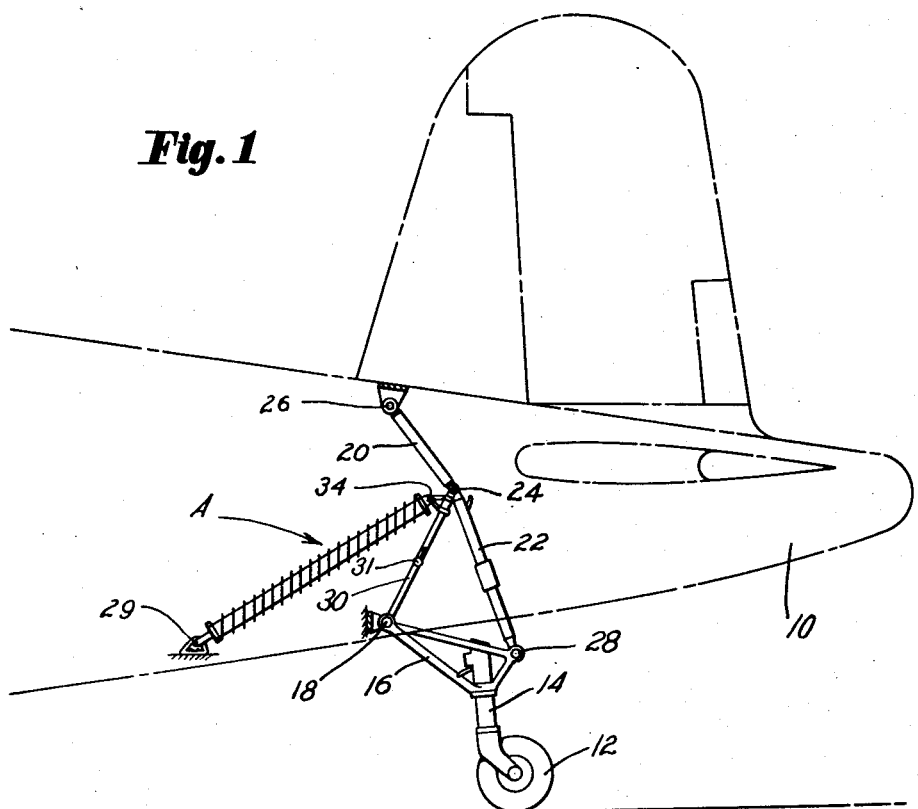
Fig. 1 shows the improved actuating strut of the invention as applied to a retractable airplane tail wheel, the latter being shown in the extended position.
Figure 2:
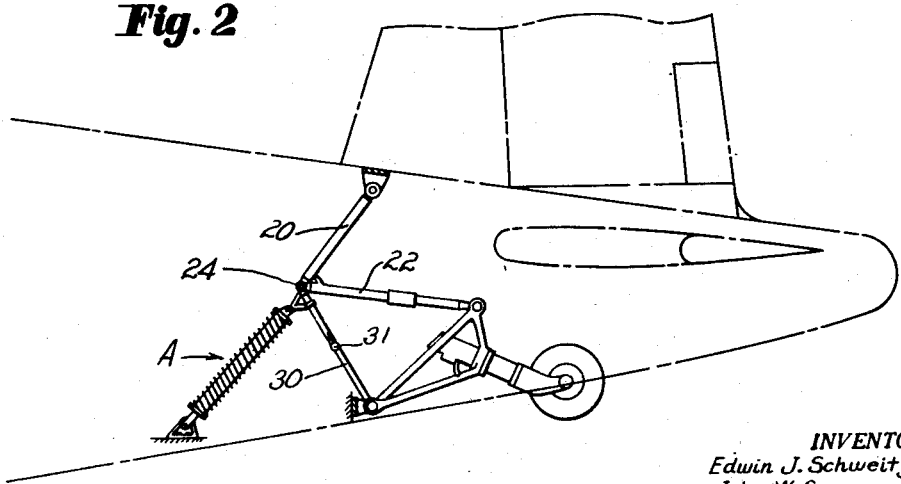
Fig. 2 shows the mechanism of Fig. 1 in the landing wheel retracted position of the parts.

Referring to Figs. 1 and 2, the airplane 10, part of which is shown in phantom in these figures, has a tail wheel 12 carried by the usual castering bracket 14 mounted on a rigid triangular frame 16, the forward corner of which is pivoted at 18 to a fixed part of the airplane frame structure.

The frame 16 which carries the tail wheel is adapted to be swung rearwardly about its pivot 18 from the extended position of the wheel shown in Fig. 1 to the retracted position shown in Fig. 2 by a usual toggle linkage including links 20 and 22 having a common pivot 24. The toggle is pivoted at its upper end at 26 to fixed airplane structure and at its lower end 28 to the frame 16 in a usual manner so that upon breaking the toggle to the left, as viewed in Fig. 1, the linkage will assume the retracted position of the wheel 12 shown in Fig. 2. Straightening of the toggle 20, 22 will cause the wheel to be swung downwardly and forwardly from the Fig. 2 position into the extended position of Fig. 1. The toggle joint 24 is also connected to the pivot point 18 by a link 30 having a jack-knife like joint at 31 allowing it to collapse rearwardly during the above movement of the toggle in a well-known manner. The toggle link 20 and the link 30, since they have their proximate ends connected by pivot 24 and their remote ends pivoted to fixed airplane structure, are placed in tension and act as stop means to limit the further movement of frame 16 and link 22 as they reach the extreme positions thereof shown in Figs. 1 and 2.

The above described tail wheel linkage is actuated by a hydraulic strut generally indicated in these figures by the letter A which is pivotally connected at 34 to the link 30 adjacent the toggle joint 24.

The strut A as shown in detail in Figs. 3 to 5 comprises a stationary end fitting, or cap, 36 carrying a bifurcated lug 38, and an end fitting, or cap, 40 which has a similar lug 42. A tubular outer casing 44 has its left hand flanged end 45 held seated on a shoulder of cap 36 by an emergency extension spring 46 which surrounds the casing 44 between the flange 45 and the cap 40. Cap 40 carries an inner telescoping cylinder 48 which has its right hand end screw-threaded into a recess 50 in the cap and which has a snug sliding fit within the tubular casing 44. The two telescoping tubes 44 and 48 comprise the outer casing of the strut and support the emergency extension spring 46 in compressed relation between the end caps 36 and 40, this spring being provided for the sole purpose of extending the strut in case of emergency when no oil pressure is available.

The inner telescoping cylinder 48 has a closure member 52 fitted in a fluidtight manner within its free end, this member being preferably of metal and having an axial passage 54 therein through which a hollow piston rod 56 extends. The piston rod 56 is screw-threaded at its left hand end into the cap 36, its interior passage 57 communicating with a passage 58 in the cap which is supplied with hydraulic fluid under pressure from a suitable source through the pipe 60.

In accordance with this invention a piston 64 carried by the free end of a piston rod 56 has a floating connection with the rod allowing a limited axial movement of the piston relative to the rod for purposes hereinafter made clear. As shown clearly in Fig. 5, the passage 57 in the piston rod 56 terminates somewhat short of the free end of the rod adjacent an annular flange 66 which is located at a point slightly beyond the closure member 52 carried by cylinder 48 when the latter is in its most extended position relative to the rod 56 as shown in Fig. 4. A transverse passage 68 extends through the flange 66 providing fluid communication between the fluid inlet passage 57 in the piston rod and the chamber between the cylinder closure 52 and piston 64. The solid end of piston rod 56 has an axial plug 70 screw-threaded thereinto which has a head 72 of sufficient diameter to extend beyond the diameter of the rod and provide a shoulder 74 (Fig. 4) forming an annular stop which cooperates with the flange 66 to limit the movement of piston 64 in its floating movement on the end of the rod. The piston 64 is provided with the usual O ring packings 76, 78 on its exterior and interior diameters which cooperate respectively with the inner surface of cylinder 48 and the outer surface of rod portion 80 of the piston rod between the stops 66 and 74.

Further, in accordance with the invention, an annular sleeve 82 is provided within the cylinder 48 adjacent the closure member 52 which has an inside diameter sufficiently large to permit the sleeve to pass freely over the flange 66 near the end of piston rod 56. Preferably, this sleeve is permanently attached to the casing 48 abutting the member 52 as shown in Figs. 3 and 4.

Hydraulic fluid for extending the actuating strut A is supplied through a passage 84 in the cap 40 which communicates with the interior of cylinder 48 and is supplied under pressure through a pipe 86. Here it will be understood that during extension of the strut, fluid is supplied through the pipe 86 to chamber 88 within the cylinder 48, while fluid in the chamber 90 on the other side of the piston 64 is discharged through passages 68, 57, 58 and pipe 60. Similarly to retract the strut from the position shown in Fig. 4 to the Fig. 3 position, hydraulic fluid is admitted through the pipe 60, passages 58, 57 and 68 to the chamber 90 between closure member 52 and piston 64, while oil is discharged from chamber 88 through passage 84 and pipe 86.

In the operation of the structure above described, it will be clear that with the relatively movable parts of the strut in retracted position, as shown in Fig. 3, the tail wheel is in its Fig. 2 retracted position in which its toggle linkage 20, 22 is broken. If it is desired to extend the tail wheel, fluid is supplied through pipe 86 to chamber 88 which first moves the piston 64 over the surface of rod portion 80 between flange 66 and shoulder 74 into engagement with flange 66. Thereafter, the piston 64 is fixed and as fluid is admitted to chamber 88 it acts on the cap 40 and piston 64 to extend the cylinder 48. During this extending movement the fluid pressure in chamber 88 acts on the piston 64 and also on the extremity of the piston rod 56, i. e. on an effective area of the head of plug 70 equal to the cross-section of portion 80 of rod 56. However, since the strut is extending the pressure in the chamber 88 is relatively low, being determined by various factors which contribute to the resistance to movement of the tail wheel linkage. This extending action continues until the toggle of the tail wheel linkage has reached the slightly over-straightened position shown in Fig. 1 in which the tail wheel linkage becomes locked in its extended position by links 20 and 30. The sleeve 82 has its length carefully predetermined so that before the linkage has reached this extended position the sleeve 82 will have engaged the piston 64 and will have moved it off its seat on the shoulder of flange 66.

It will be evident that upon the unseating of piston 64 above described, by the engagement by the sleeve 82, the pressure of the fluid in chamber 88 which is acting on the area of the piston 64 is no longer exerted in an axial direction against the piston rod 56 through the flange 66. Instead this pressure is now transmitted through the sleeve 82 to the walls of cylinder 48 which carries the cap 40 at its other end and thus places the walls of this cylinder in tension. As the strut completes its extending movement and the pressure in chamber 88 builds up to full line pressure, the only area on which it acts to apply compression forces on the slender hollow piston rod 56 is an area on plug 70 corresponding to the cross-section of portion 80 of rod 56. This area in the structure illustrated is approximately one-eighth of the internal cross-section area of the cylinder 48, and accordingly, the piston rod at the end of the working stroke is subjected to only a relatively small force.

It will be evident that as a result of this invention, the outside diameter as well as the wall thickness of the piston rod 56 can be materially reduced with a resulting reduction in overall size and weight of the entire strut. It will also be evident that the full line pressure which builds up in the chamber 88 after the strut is fully extended, which is much greater than pressure in this chamber during the extension of the strut, is resisted by the walls of cylinder 48 in tension, thus relieving the piston rod 56 from the severe compression forces to which it would be subjected if the piston 64 were rigidly carried thereby.

It will further be evident that as a result of this invention considerable variation is permitted in the overall length of the tail wheel linkages in their extended positions due to the over-travel provided in the strut as a result of the floating piston construction of this invention.

While the invention has been described in detail in connection with an actuating strut for an airplane landing gear the invention is not limited to this particular application but is equally applicable to any hydraulic actuating strut irrespective of its use. It will also be understood that various changes may be made in the construction and arrangement of the parts without departing from the scope of the invention as defined by the appended claims.

What it is desired to secure by U. S. Letters Patent is:

1. In a piston and cylinder combination, a piston rod extended through an end wall of the cylinder and terminating within said cylinder and having its free end exposed to the pressure of the fluid in said cylinder during relative extending movement of said rod and cylinder, a piston adjacent the free end of said rod dividing said cylinder into two chambers and having a lost motion connection with said rod for permitting limited relative movement between said rod and piston in an axial direction, said rod having a fluid passage therein communicating with the chamber in said cylinder at one side of said piston, fluid connections, one of which communicates through said fluid passage with the chamber on one side of said piston and the other of which communicates with the chamber on the opposite side of said piston, and means for reducing the force exerted by said piston on said rod when the full line pressure of the fluid builds up at the end of an extending movement of said cylinder and rod including a sleeve in said cylinder for engaging the piston just prior to the completion of an extending operation of said cylinder and rod.

2. An actuating hydraulic strut comprising relatively movable cylinder and piston elements, one of which is connected to a fixed support and the other of which is operatively connected to a movable member, said piston element including a piston in said cylinder and a piston rod extended through an end wall of said cylinder and terminating within said cylinder with its free end exposed to the pressure fluid within said cylinder during extension of said strut, said rod having a lost motion connection with said piston for permitting limited movement between said piston and rod in an axial direction and having a fluid passage therein communicating with the chamber in said cylinder at one side of said piston, a stop for engaging said piston just prior to the completion of an extending operation of said strut, and two fluid connections, one of which communicates with said passage in said rod, for admitting fluid under pressure to said cylinder selectively on opposite sides of said piston to extend or contract the strut.

3. An actuating hydraulic strut comprising relatively movable cylinder and piston elements, one of which is connected to a fixed support and the other of which is operatively connected to a movable member, said piston element including a piston in said cylinder and a piston rod extended through an end wall of said cylinder and terminating within said cylinder with its free end exposed to the pressure fluid within said cylinder during extension of said strut, said rod having a lost motion connection with said piston for permitting limited movement between said piston and rod in an axial direction and having a fluid passage therein communicating with the chamber in said cylinder at one side of said piston, fluid connections, one of which communicates with said passage in said rod, for admitting fluid under pressure to said cylinder selectively on opposite sides of said piston to extend or contract said strut, and abutment means on said cylinder for engaging said piston in an extended position of said strut.

4. An actuating hydraulic strut comprising relatively movable cylinder and piston elements, one of which is connected to a fixed support and the other of which is operatively connected to a movable member, said piston element including a piston in said cylinder and a piston rod extended through an end wall of said cylinder and terminating within said cylinder with its free end exposed to the pressure fluid within said cylinder during extension of said strut, said rod having a lost motion connection with said piston for permitting limited movement between said piston and rod in an axial direction and having a fluid passage therein communicating with the chamber in said cylinder at one side of said piston, fluid connections, one of which communicates with said passage in said rod, for admitting fluid under pressure to said cylinder selectively on opposite sides of said piston to extend or contract said strut, and abutment means in said cylinder adjacent said end wall thereof in a position to engage said piston in an extended position of said strut to stop the working stroke of said piston and short of the stroke of said strut, whereby in the final part of the working stroke the strut is subjected to a force due to the working pressure acting only on the free end of said rod.

5. An actuating hydraulic strut comprising relatively movable cylinder and piston elements, one of which is connected to a fixed support and the other of which is operatively connected to a movable member, said piston element including a piston in said cylinder and a piston rod extended through an end wall of said cylinder and terminating within said cylinder with its free end exposed to the pressure fluid within said cylinder during extension of said strut, said rod having a lost motion connection with said piston for permitting limited movement between said piston and rod in an axial direction and having a fluid passage therein communicating with the chamber in said cylinder at one side of said piston, fluid connections, one of which communicates with said passage in said rod, for admitting fluid under pressure to said cylinder selectively on opposite sides of said piston to extend or contract said strut, and an annular abutment member seated in said cylinder and engageable with said piston in an extended position of said strut and against which the force of the pressure fluid acting on said piston acts to place the cylinder wall in tension.

6. An actuating hydraulic strut comprising relatively movable cylinder and piston elements, one of which is stationary and the other of which is operatively connected to a movable member, said piston element including a piston reciprocable in said cylinder and a piston rod which passes through an opening in an end wall of said cylinder, said piston rod having an axial passage therein, means for supplying fluid through the head end of said cylinder to act on one side of said piston, means including said passage in said rod for supplying fluid to act on the other side of said piston, said piston rod having two axially spaced shoulders at its inner end between which said piston is slidably mounted and against which the piston is seated in response to fluid pressure acting thereon to shorten or lengthen said strut, and an abutment carried by said cylinder for engaging said piston as said movable element approaches the extended position of said strut for effecting relative movement between said rod and piston into a position in which said piston lies between and out of engagement with said shoulders.

7. The combination claimed in claim 6 in which the piston rod has an end fitting which carries an outer tubular casing telescoping with the cylinder element.

8. The combination claimed in claim 6 in which the remote ends of said cylinder element and piston rod have end fittings providing confronting axial shoulders, said piston rod fitting carries an outer tubular casing telescoping with the cylinder element and an outer concentric compression spring is provided surrounding said telescoping cylinder and casing and having its opposite ends abutting said shoulders for extending said strut mechanically upon failure of hydraulic pressure in the cylinder.

JOHN W. COURSEN.
EDWIN J. SCHWEITZER.

REFERENCES CITED

The following references are of record in the file of this patent:

UNITED STATES PATENTS

| Number | Name | Date |
|---|---|---|
| 767,732 | Bromley | Aug. 16, 1904 |
| 787,480 | Tanner | Apr. 18, 1905 |
| 834,825 | Logan | Oct. 30, 1906 |
| 1,187,946 | Vincent | June 20, 1916 |
| 1,231,257 | Herr | June 26, 1917 |
| 1,635,331 | Krisch | July 12, 1921 |
| 2,259,576 | MacMillin | Oct. 21, 1941 |
| 2,357,986 | Wichterman | Sept. 12, 1944 |
| 2,366,121 | Hurst | Dec. 26, 1944 |
| 2,464,962 | Bent | Mar. 22, 1949 |

FOREIGN PATENTS

| Number | Country | Date |
|---|---|---|
| 243,177 | Germany | Apr. 22, 1911 |